(12) United States Patent
Brandes et al.

(10) Patent No.: US 10,023,267 B2
(45) Date of Patent: Jul. 17, 2018

(54) POLYMER DRAG REDUCTION SYSTEMS ON VEHICLE SURFACES

(71) Applicant: LOCKHEED MARTIN CORPORATION, Bethesda, MD (US)

(72) Inventors: John C. Brandes, Palm Beach Gardens, FL (US); Steven Edward Bullock, Canton, GA (US); Joseph M. Cuschieri, Boca Raton, FL (US); Vincent J. Forst, Jupiter, FL (US); Brian Robert Said, Jupiter, FL (US); Joseph M. Solenski, Fort Lauderdale, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/255,831

(22) Filed: Sep. 2, 2016

(65) Prior Publication Data
US 2017/0066504 A1    Mar. 9, 2017

Related U.S. Application Data

(60) Provisional application No. 62/214,589, filed on Sep. 4, 2015.

(51) Int. Cl.
*B63B 1/34* (2006.01)
*B63G 8/00* (2006.01)
*B63G 8/04* (2006.01)

(52) U.S. Cl.
CPC ............. *B63B 1/34* (2013.01); *B63G 8/001* (2013.01); *B63G 8/04* (2013.01); *B63B 2001/345* (2013.01); *B63G 2008/004* (2013.01); *Y02T 70/121* (2013.01)

(58) Field of Classification Search
CPC ........ F42B 19/00; F42B 19/12; F42B 19/125; B63B 1/00; B63B 1/34; B63B 1/38; B63G 8/001; B63G 8/04
USPC ................................................ 114/67 A, 67 R
See application file for complete search history.

(56) References Cited

U.S. PATENT DOCUMENTS

| 3,303,811 | A | * | 2/1967 | Giles ........................ B63B 1/38 |
| | | | | 114/67 R |
| 3,382,831 | A | | 5/1968 | Madison |
| 3,392,693 | A | | 7/1968 | Hulsebos et al. |
| 4,186,679 | A | | 2/1980 | Fabula et al. |
| 8,381,672 | B1 | | 2/2013 | Eriksen |

(Continued)

OTHER PUBLICATIONS

International Search Report and Written Opinion for application No. PCT/US2016/050142, dated Nov. 21, 2016 (16 pages).

*Primary Examiner* — Lars A Olson
(74) *Attorney, Agent, or Firm* — Hamre, Schumann, Mueller & Larson, P.C.

(57) ABSTRACT

Systems and methods of reducing drag on outer surfaces of vehicles that are in contact with water using a polymer solution that reduces the drag on the outer surfaces of the vehicles as the vehicles travel through water. A polymer solution is passively ejected into the boundary layer of the water flowing past the outer surface of the vehicle. The polymer solution is mixed and introduced into the boundary layer passively with minimal or no usage of electrical energy. The passive mixing and ejection of the polymer solution minimizes energy consumption, thereby maximizing electrical energy consumption efficiency during operation of the vehicle.

18 Claims, 11 Drawing Sheets

(56) References Cited

U.S. PATENT DOCUMENTS

2004/0042150 A1    3/2004   Swinbanks et al.
2011/0226175 A1    9/2011   Gosling
2014/0053768 A1    2/2014   Brizard
2015/0013586 A1    1/2015   Sancoff et al.

* cited by examiner

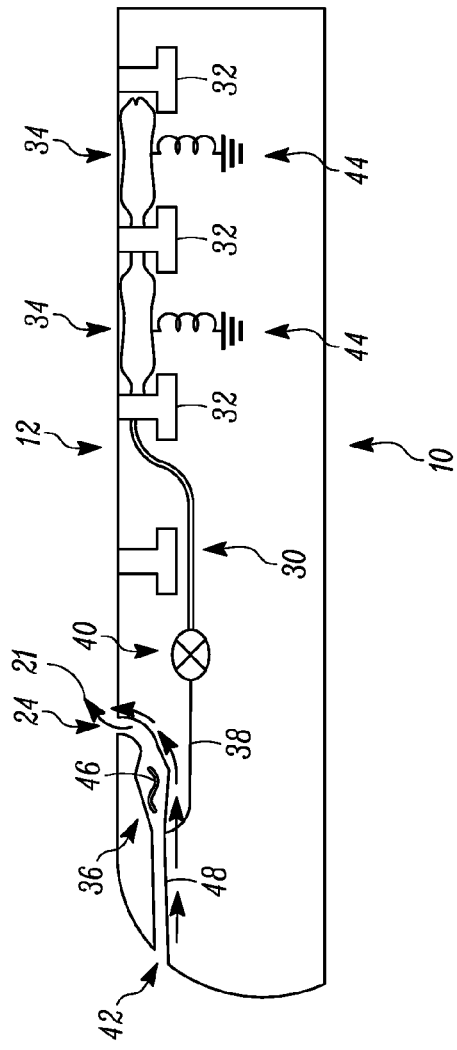
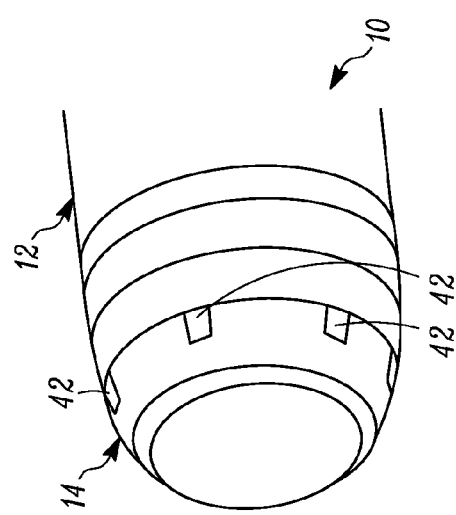
FIG. 2
FIG. 2A

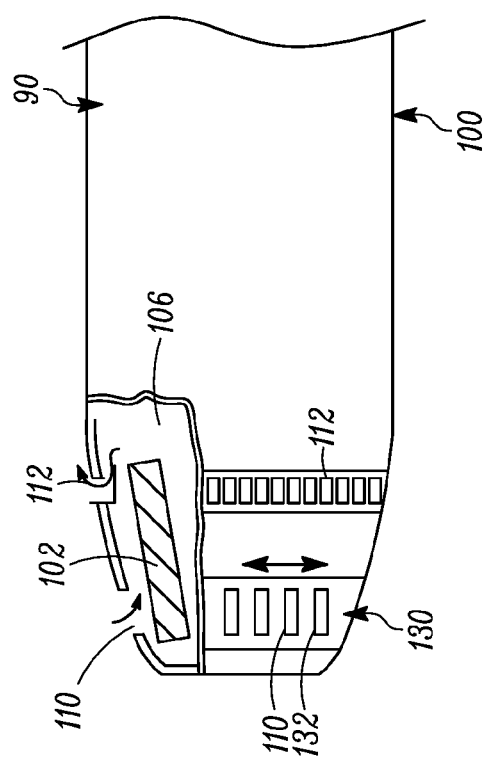
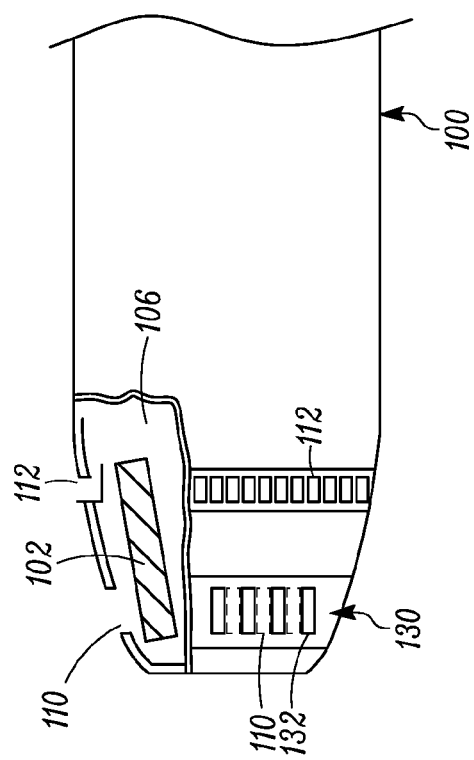
FIG. 9A
FIG. 9B

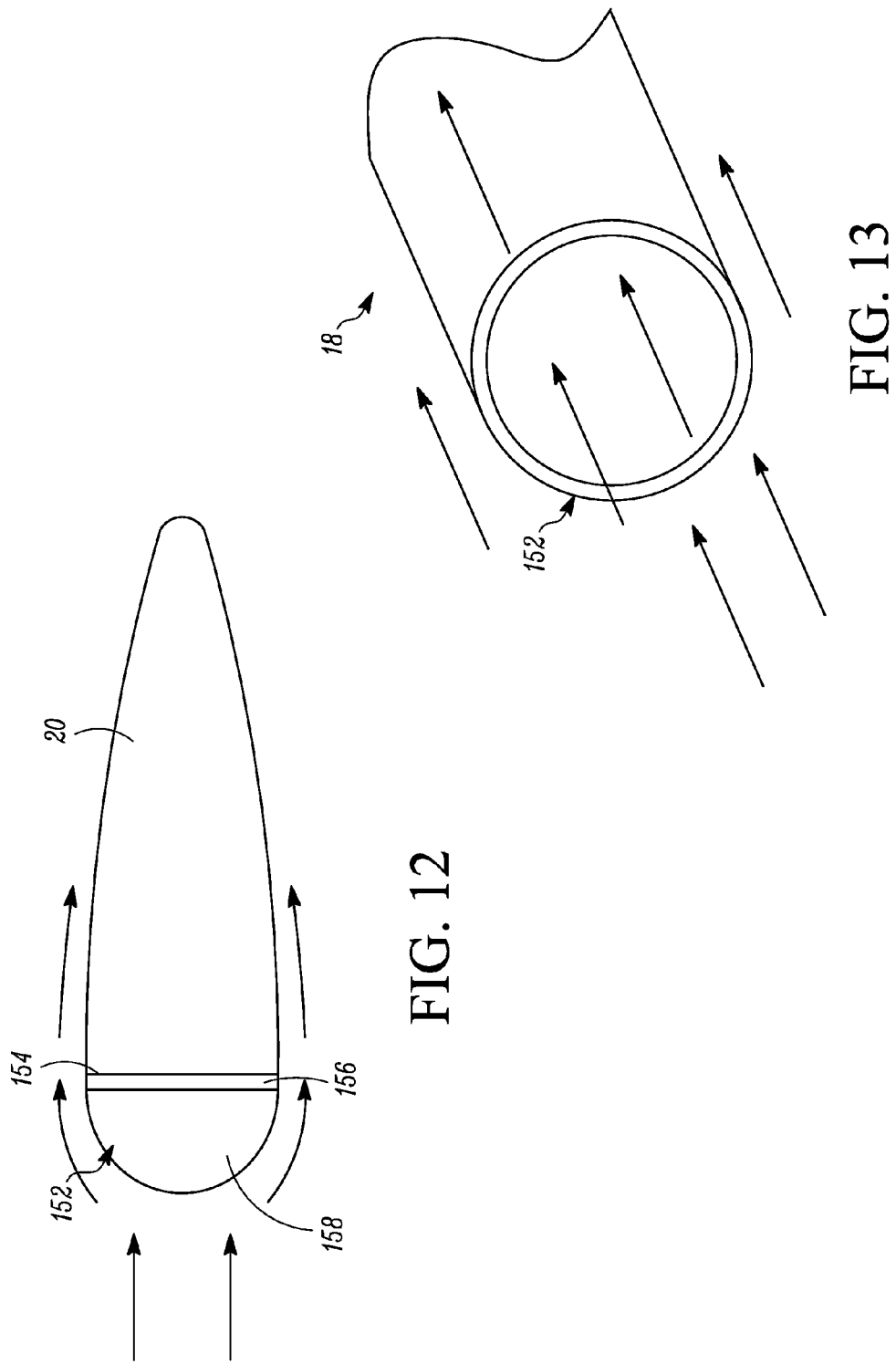

POLYMER DRAG REDUCTION SYSTEMS ON VEHICLE SURFACES

FIELD

This technical disclosure relates to techniques for reducing drag on surfaces of vehicles that are in contact with water, including surface vehicles and underwater vehicles such as unmanned underwater vehicles (UUVs) and autonomous underwater vehicles (AUVs), using a polymer solution.

BACKGROUND

Various approaches to reducing drag on underwater vehicles using a polymer solution that is introduced into the boundary layer are described in U.S. Pat. Nos. 3,382,831, 3,392,693, and 4,186,679.

SUMMARY

This disclosure describes systems and methods of reducing drag on outer or exterior surfaces of vehicles that are in direct, intimate contact with water using a polymer solution that reduces the drag on the surfaces as the vehicles travel through the water. The systems and methods described herein can be utilized on any vehicle surface that is in contact with the water. The vehicles can be surface vehicles or underwater vehicles including manned underwater vehicles, or unmanned vehicles such as AUVs and UUVs. In the case of an underwater vehicle, the underwater vehicle can be completely submerged in water during use, or only partially submerged in water during use.

The techniques described herein introduce a polymer solution into the boundary layer of the water flowing past a surface of the vehicle. The polymer solution is mixed within the vehicle and introduced into the boundary layer passively with minimal or no usage of electrical energy. For example, an electrically driven pump is not used to distribute the polymer or the polymer solution within the vehicle or to force the polymer solution from the vehicle into the boundary layer.

In some vehicles, such as AUVs or UUVs, the range, endurance, and envelope of operation are limited by the amount of storage volume available for propulsion energy for a given level of vehicle drag. Therefore, energy storage density, energy conversion efficiency, and vehicle drag are key performance parameters. The techniques for reducing drag using passive mixing and ejection of the polymer solution described herein minimize energy consumption, thereby maximizing electrical energy consumption efficiency during operation of the vehicle, including during high-speed, low angle of attack operations. In contrast, active pumping system components such as described in U.S. Pat. Nos. 3,392,693 and 4,186,679 reduce drag at the expense of added energy consumption and increased weight.

In one embodiment described herein, the polymer can be in liquid form in the vehicle and stored in one or more flexible bladders that are located in the vehicle. The bladders can be exposed to ambient pressure which acts on the bladder(s). One or more force applying mechanisms act on the bladder(s) to force the liquid polymer from the bladder(s). One or more metering valves can be used to control the amount of the liquid polymer that flows from the bladder(s) to a mixing chamber where the liquid polymer mixes with water to create a polymer solution that is then passively ejected into the boundary layer due to a pressure differential existing between one or more water inlets and the outlet(s) for the polymer solution.

In another embodiment described herein, the polymer can be in the form of a water-soluble solid body. The solid polymer body can be disposed within the vehicle at a location so that the solid polymer body is exposed to water in which the vehicle is disposed that is passively circulated, under forced convection, around, over, and/or through channels in the solid polymer body. The water contacting the solid polymer body dissolves some of the polymer which mixes with the water to form the polymer solution that is then passively ejected into the boundary layer due to a pressure differential existing between one or more water inlets and the outlet(s) for the polymer solution. In other embodiments, the water-soluble solid polymer body can be disposed outside the vehicle where the solid polymer body is directly exposed to the water in which the vehicle is disposed. The solid polymer body, whether mounted in the vehicle interior or on the vehicle exterior, can be made in a shape that will simplify fabrication and packaging within or on the vehicle.

The polymer solution ejection techniques described herein can be utilized on any outer surface(s) of the vehicle that is subject to drag resulting from the surface being in contact with the water as the vehicle travels through the water. Examples of surfaces on which the polymer solution ejection can be utilized include, but are not limited to, an exterior surface of the hull of the vehicle, a surface on a fixed or actuatable control fin connected to the hull, a surface on a duct (for example surrounding a propeller) connected to the hull, a surface on a nose cone or tail cone of the hull, a surface of a propeller of a propulsion mechanism that propels the vehicle through the water, and other appendages of the vehicle that are in contact with the water.

DRAWINGS

FIG. 2 illustrates a portion of an interior of the vehicle of FIG. 1 with a system for ejecting polymer solution for drag reduction.

FIG. 2A is a perspective view of the front end of the vehicle of FIGS. 1 and 2.

FIGS. 9A and 9B illustrate operation of one example of a mechanism that can be used to meter the inlet flow of water for creating the polymer solution.

FIG. 12 is a cross-sectional view taken along line 12-12 of FIG. 11 showing the water-soluble solid polymer applied to the leading edge of a fin of the vehicle.

FIG. 13 is a partial perspective view of a duct used on the vehicle of FIG. 11 where the water-soluble solid polymer is applied to the leading edge of the duct.

DETAILED DESCRIPTION

Unless otherwise defined or indicated to the contrary in the description or claims, a vehicle as used herein is intended to mean any type of surface or submersible vehicle that has at least one surface thereof that is in direct, intimate contact with water as the vehicle travels through the water. The vehicle can be completely submerged in water during use in the case of a submersible, or the vehicle can be a surface vehicle with only portions of the vehicle in contact with the water during use. Examples of vehicles on which the concepts described herein can be used include, but are not limited to, manned or unmanned surface vehicles such as military, commercial or recreational vessels or boats, unmanned submersible vehicles such as UUVs, AUVs, and torpedoes, and manned submersible vehicles.

Unless otherwise defined or indicated to the contrary in the description or claims, the techniques described herein can be utilized on any outer or exterior vehicle surface that is in direct contact with the water during use of the vehicle and where drag is created on the surface by the water as the vehicle moves through the water. Examples of vehicle surfaces on which the concepts described herein can be used include, but are not limited to, an exterior surface of the hull of the vehicle, a surface on a fixed or actuatable control fin connected to the hull, a surface on a duct, for example surrounding a propeller, connected to the hull, a surface on a nose cone or tail cone of the hull, a surface of a propeller of a propulsion mechanism that propels the vehicle through the water, and other appendages of the vehicle that are in contact with the water.

The vehicles described herein can operate in seawater, freshwater or brackish water. Therefore, the polymer solution described herein can be formed from a polymer mixed together with seawater, freshwater or brackish water (hereinafter referred to collectively as "water").

Figure 1:
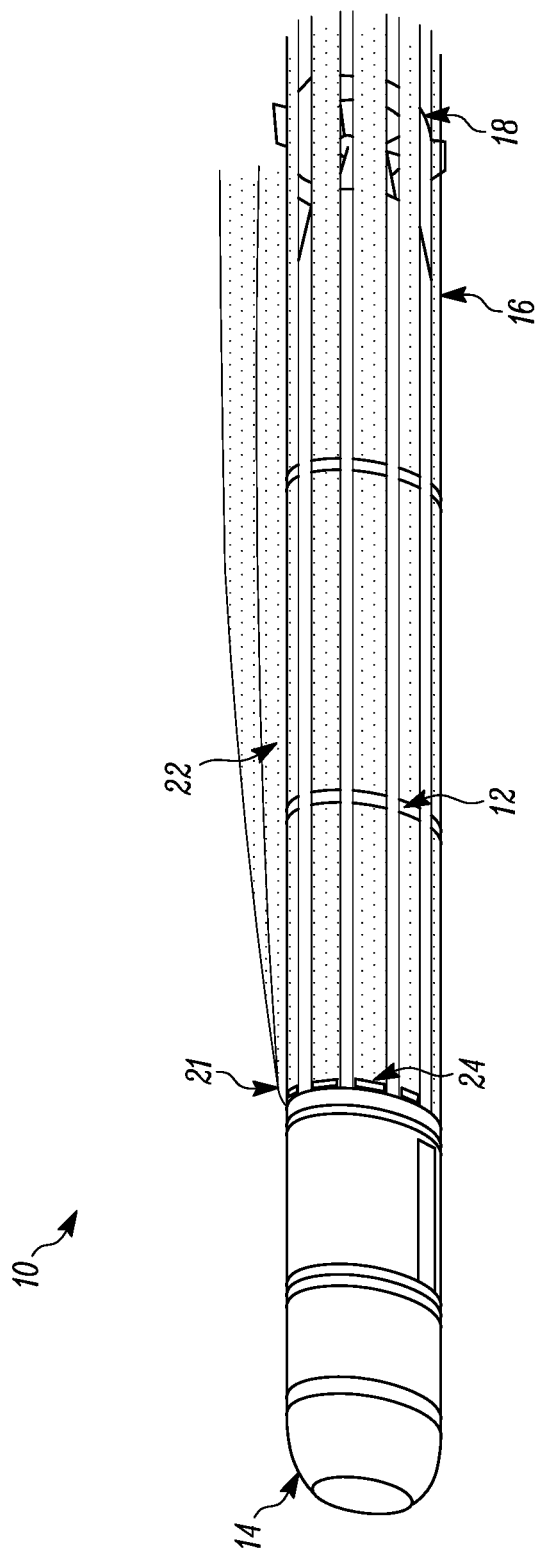
FIG. 1 illustrates an example of a vehicle in the form of an underwater vehicle that uses a polymer solution to reduce drag on the hull of the underwater vehicle.

FIG. 1 illustrates a vehicle 10 in the form of an underwater vehicle that has a generally cylindrical hull 12, a front end 14 of the hull 12 that is hydrodynamically-shaped, for example bullet-shaped, to enhance the hydrodynamic efficiency of the vehicle 10, and a rear end 16 that can include a propulsion mechanism 18, for example a ducted propeller (best seen in FIG. 5), for propelling the vehicle 10 through the water. The vehicle 10 may also include other appendages such as fixed or steerable control fins 20 (best seen in FIG. 5) for directional control of the vehicle 10 through the water.

As shown in FIGS. 1 and 2, a polymer solution 21 is passively ejected from the vehicle 10 into the boundary layer 22 that develops around the vehicle 10 as the vehicle moves through the water to reduce skin friction drag on the vehicle 10. In the example illustrated in FIGS. 1 and 2, the polymer solution 21 is ejected through outlets 24 circumferentially spaced around the circumference of the hull 12 to reduce the drag on the hull 12. In some embodiments, the polymer solution 21 can be ejected around substantially the entire circumference of the hull 12, and the amount of polymer solution 21 that is ejected is substantially continuous around the circumference. In other embodiments discussed below, the polymer solution 21 can be ejected at select locations of the hull 12 that is less than the entire circumference and/or the amount of the polymer solution 21 ejected can vary depending upon location around the circumference. Further, in addition to or separately from ejecting the polymer solution 21 to reduce drag on the hull 12, polymer solution 21 can be ejected at other locations of the vehicle 10, such as from the duct of the propulsion mechanism 18 and/or from one or more of the fins 20 or other surfaces of the vehicle 10 as discussed further below.

Referring to FIG. 2, an example of a portion of an interior of the vehicle 10 that includes a system 30 for creating and ejecting the polymer solution 21 is illustrated. In this example, the vehicle 10 is illustrated as including a plurality of axially spaced, circumferential hull ribs 32 that provide structural rigidity to the hull 12. The space between the hull ribs 32 is exposed to the ambient pressure of the water that the vehicle 10 is operating in.

The system 30 includes at least one bladder 34 or storage chamber that stores a liquid polymer therein, a mixing chamber 36 where the polymer solution 21 is created, at least one fluid passage 38 fluidly connecting the bladder 34 to the mixing chamber 36, a metering valve 40 in the fluid passage 38, at least one water inlet 42, and at least one of the polymer solution outlets 24.

The bladder 34 can be positioned in the space between two of the hull ribs 32 which helps to utilize space in the vehicle 10 that may otherwise not be utilized. The bladder 34 stores the polymer in liquid form that will be used to generate the polymer solution 21. The polymer stored in the bladder 34 can be any polymer that is suitable for use in the polymer solution 21 to reduce drag, such as a high molecular weight water-soluble polymer. Examples of polymers that can be used are disclosed in U.S. Pat. No. 4,186,679, the entire contents of which are incorporated herein by reference.

The bladder 34 can be a circumferential ring structure that extends circumferentially around the entire interior circumference of the vehicle 10. The bladder 34 is flexible and compressible, and is located in a flooded area of the vehicle 10 that is exposed to ambient water pressure, and is "pressure balanced". A stored energy force applying mechanism 44 acts on the bladder 34 to provide pressurization of the liquid polymer above ambient pressure. The force applying mechanism 44 can be any stored energy force applying device(s) including, but not limited to, one or more springs, one or more bellows, one or more diaphragms, a pressurized gas device, thermo-chemical (exo-thermic) reactants that can produce heat and pressure, and combinations thereof. The mechanism 44 will apply a force to the bladder 34 to push the liquid polymer out of the bladder 34 through the fluid passage 38 to the metering valve 40 providing positive flow of liquid polymer, independent of depth, from the bladder 34 to the mixing chamber 36.

In some embodiments, a plurality of the bladders 34 can be provided. FIG. 2 shows the use of two of the bladders 34. As discussed further below, the bladders 34 can be serially connected to one another so that liquid polymer from one bladder 34 flows into the other bladder 34 and then into the fluid passage 38. Alternatively, as also discussed further below, the bladders 34 can each be separately fluidly connected to the mixing chamber 36. The use of more than one bladder 34 increases the amount of liquid polymer that can be stored on the vehicle 10. In addition, one type of liquid polymer having particular drag reduction properties can be stored in one of the bladders, while a different type of liquid polymer with different drag reduction properties can be stored in another one of the bladders.

The fluid passage 38 leads from the bladder 34 to direct the liquid polymer into the mixing chamber 36. The flow of the liquid polymer through the fluid passage 38 is controlled by the metering valve 40 to control the amount of the liquid polymer flowing into the mixing chamber 36. The metering valve 40 can be the only component of the system 30 that utilizes electrical energy and can be controlled by a controller (not shown) in the vehicle 10 to regulate the amount of the liquid polymer flowing to the mixing chamber 36.

The one or more water inlets 42 allow water to enter the interior of the vehicle 10 and flow to the mixing chamber 36 for creating the polymer solution 21 with the liquid polymer, with the polymer solution 21 then flowing out through the outlets 24. The water inlet(s) 42 is an opening or plurality of openings that can be located at the front end 14 or nose of the hull 12 at any location that is suitable for allowing ingress of water. In one example, the water inlet(s) 42 is located at a location on the front end 14 where increased pressure due to stagnation of the water develops. In one embodiment, a plurality of the water inlets 42 are provided (as shown in FIG. 2A) that are circumferentially equally spaced from one another about the circumference of the front end 14. Each inlet 42 is individually fluidly connected to the mixing chamber 36 so that water entering each inlet 42 flows into the mixing chamber 36. Alternatively, each inlet 42 can communicate with an inlet water manifold (not shown) that in turn is in fluid communication with the mixing chamber 36 to direct water from the manifold into the mixing chamber 36.

In one embodiment, the water inlets 42 are located on the vehicle 10 where the pressure is higher than the pressure at the outlets 24. As a result, the water can continuously flow into and through the vehicle 10 via the mixing chamber 36 and out the outlets 24. In other embodiments, water flow into the water inlets 42 and through the vehicle 10 can be controlled via a suitable flow control mechanism such as one similar to the flow control mechanism discussed below with respect to FIGS. 9A and 9B.

In the embodiment illustrated in FIG. 2, the mixing chamber 36 is a circumferential ring structure that extends circumferentially around the entire interior circumference of the vehicle 10. The mixing chamber 36 receives the liquid polymer from the bladder 34 and the water from the inlets 42, and mixes the two to form the polymer solution 21. To aid in mixing, a static mixer 46 can be disposed in the mixing chamber 36 to help achieve mixing of the water and the liquid polymer to create the polymer solution 21. As shown in FIG. 2, the fluid passage 38 can intersect a water passage 48 that directs the water from the inlet 42 into the mixing chamber 36 just upstream of the mixing chamber 36. The water flowing through the water passage 48 creates a venturi effect on the liquid polymer in the fluid passage 38, helping to draw the liquid polymer through the fluid passage 38 and into the mixing chamber 36.

This "direct injection mixing" and passive intake and ejection of entwined flows of water and liquid polymer utilizes pressure gradients that are developed between the high stagnation pressure at the nose where the inlets 42 are located and the low pressure on the hull sides at the outlets 24. Precise delivery of water and liquid polymer will be achieved by employing fluidic metering via the metering valve 40 to start/stop/re-start the flow of liquid polymer, and control of the ratio of water to liquid polymer, ensuring optimal dispersion into the boundary layer, to conserve polymer while providing drag reduction over select portions of the vehicle's 10 mission.

The polymer solution 21 generated in the mixing chamber 36 is then passively ejected through one or more outlets formed in a surface of the vehicle 10. Passive ejection as used herein refers to ejection of the polymer solution 21 without the use of an electrically driven pump. In the illustrated embodiment, the polymer solution 21 is passively ejected due to a pressure differential between the inlets 42 and the outlets 24, the pressure differential between the inlets 42 and the outlet 24 being sufficient to result in the polymer solution 21 passively flowing out of the outlets 24. In one embodiment, when the metering valve 40 is closed to prevent flow of liquid polymer to the mixing chamber 36, the water can still flow through the vehicle 10 from the inlets 42 and out of the outlets 24 unless a flow control mechanism is provided for the water as described above. In another embodiment, the polymer solution 21 may be passively ejected as a result of hydrostatic pressure acting on one or more of the bladders 34 that could result in passive ejection of the polymer solution 21 into, for example, higher pressure areas such as the front end 14 and/or lower pressure areas such as a side area of the hull 12 that contains the outlets 24.

Figure 5:
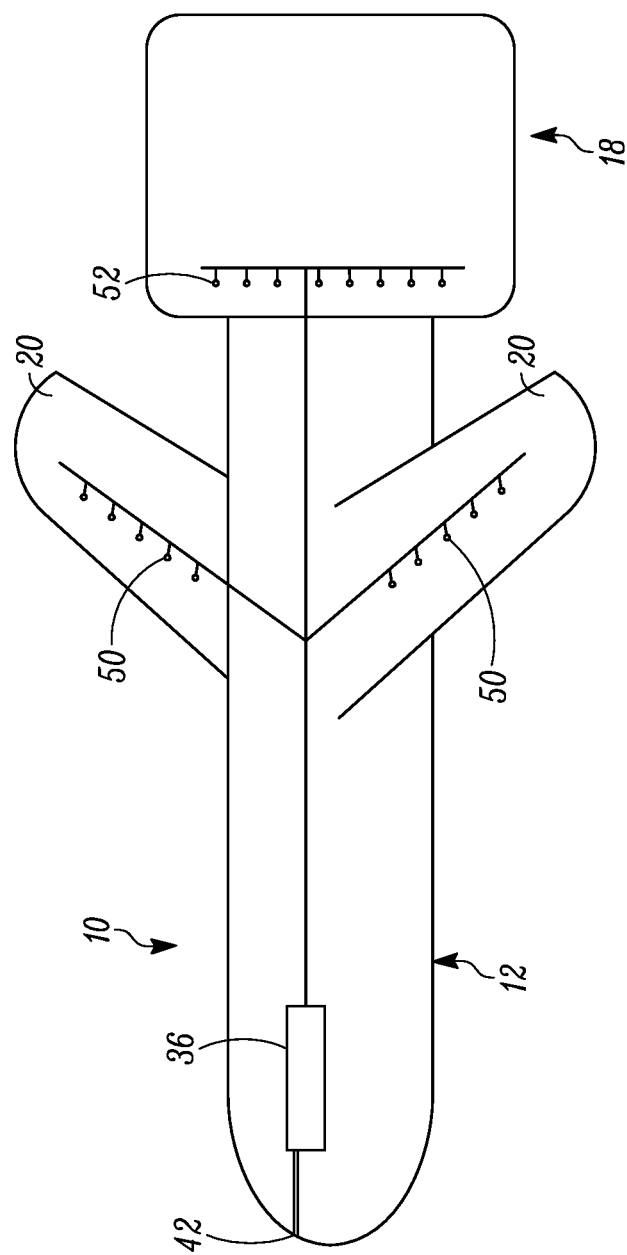
FIG. 5 is a schematic depiction of polymer solution ejection for drag reduction on vehicle surfaces other than or in addition to the hull.

In the example illustrated in FIG. 2, the polymer solution 21 can be ejected through the plurality of outlets 24. In other embodiments, the polymer solution 21 can be ejected through outlets formed in other surfaces, for example one or more outlets 50 formed in one or more of the fins 20 and/or one or more outlets 52 formed in an interior surface and/or exterior surface of the duct of the propulsion mechanism 18 as shown in FIG. 5.

As indicated in FIG. 2, in the case of discharge of the polymer solution 21 around the hull 12, the water inlets 42 are positioned forwardly of the outlets 24. In addition, the outlets 24 are positioned rearwardly of the mixing chamber 36. The inlets 42 and the outlets 24 can be positioned at any locations relative to one another where a pressure differential is achieved between the two to permit the passive ejection of the polymer solution 21 so that the polymer solution 21 is not pumped by an electrically driven pump, and both the creation and discharge of the polymer solution 21 can be accomplished with reduced use of electrical energy.

Figure 3:
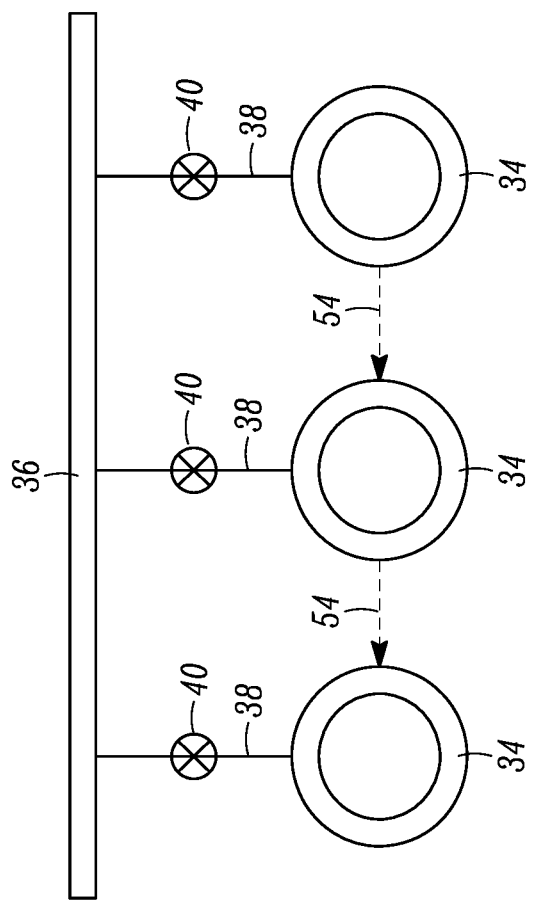
FIG. 3 is a schematic depiction of another embodiment of a system for ejecting polymer solution for drag reduction.

FIG. 3 schematically depicts an embodiment where three of the bladders 34 described above are provided each of which is acted upon by stored energy force applying mechanisms (not shown) as described above. Each of the bladders 34 can be directly connected (i.e. connected in parallel) to the mixing chamber 36 by one of the fluid passages 38 with its own metering valve 40. Each metering valve 40 controls the flow of the liquid polymer from its associated bladder 34 into the mixing chamber 36. Alternatively, as illustrated in dashed lines in FIG. 3, the bladders 34 can be serially connected to one another by flow passages 54 so that, for example, liquid polymer from the bladder 34 on the right in FIG. 3 can flow into the center bladder 34 which then flows into the bladder 34 on the left, and the liquid polymer then flows through the fluid passage 38 into the mixing chamber 36.

Figure 4:
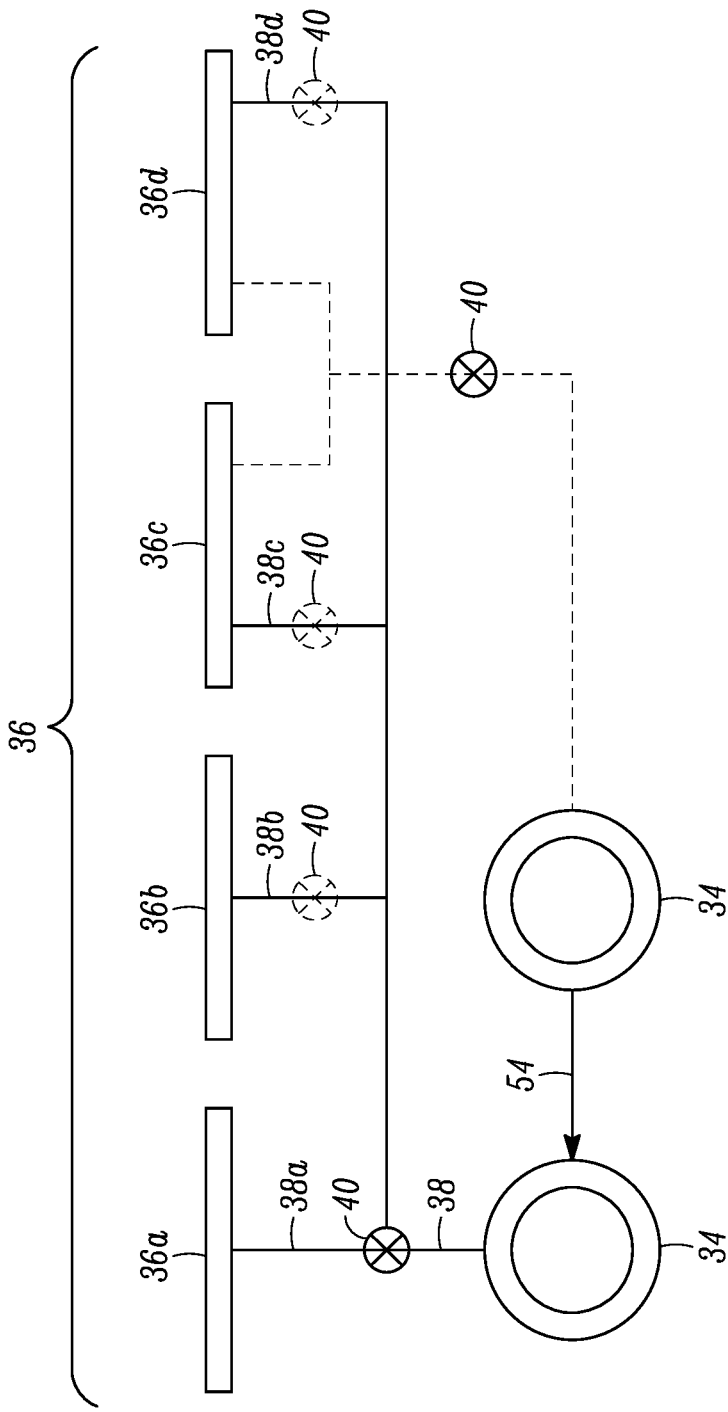
FIG. 4 is a schematic depiction of another embodiment of a system for ejecting polymer solution for drag reduction.

FIG. 4 schematically depicts an embodiment where, instead of a single, circumferentially continuous mixing chamber 36, the mixing chamber 36 is divided into zones 36a, 36b, 36c, 36d. The zones 36a-d can be physically separated or spaced from one another, or the zones 36*a-d* can be fluidly separated sections of a single mixing chamber. Although four zones 36*a-d* are illustrated, a smaller or larger number of zones can be provided. In this example, two of the bladders 34 are serially connected by the fluid passage 54, and the flow passage 38 is divided into four separate passages 38*a*, 38*b*, 38*c*, 38*d* connected to respective ones of the mixing chamber zones 36*a-d*. Each of the bladders 34 can be acted upon by stored energy force applying mechanisms (not shown) as described above. Flow of the liquid polymer through each passage 38*a-d* is controlled by the metering valves 40. Alternatively, the metering valves 40 in the flow passages 38*b-d* are optional (as indicated by the dashed lines) with the metering valve 40 in the flow passage 38 controlling the flow to all of the zones 36*a-d*.

In another alternative configuration shown in dashed lines in FIG. 4, the mixing chamber zones 36*a-d* can be supplied with liquid polymer from separate ones of the bladders 34 each of which is acted upon by stored energy force applying mechanisms (not shown) as described above. For example, one of the bladders 34 can supply liquid polymer to the mixing chamber zones 36*a-b* while the other bladder 34 can supply liquid polymer to the mixing chamber zones 36*c-d*.

One advantage of using mixing chamber zones is that the discharge of the polymer solution 21 can be controlled to select portions of the surface. For example, with some angles of attack of the vehicle 10, the resulting drag that is produced on surfaces of the vehicle 10 can vary significantly based on location on the surface. Therefore, polymer solution 21 or more polymer solution 21 can be ejected to areas of high drag, while no polymer solution 21 or less polymer solution 21 can be ejected to areas of lower drag.

Returning to FIG. 2, an example operation of drag reduction on the hull 12 of the vehicle 10 will be described. Drag reduction on other surfaces of the vehicle 10 operates in a similar manner, for example as illustrated in FIG. 5. When the metering valve 40 is closed, water flows continuously through the vehicle 10 from the inlets 42 and out the outlets 24. When drag reduction is desired, the metering valve 40 is opened to achieve the desired amount of liquid polymer flow. In one embodiment, the opening degree of the metering valve 40 can be controlled based on the speed of the vehicle 10, for example the metering valve 40 can increase the amount liquid polymer flow as the speed of the vehicle 10 increases. The liquid polymer is forced from the bladder(s) 34 and through the fluid passage 38 by the force applying mechanism(s) 44. At the same time, water flowing through the water passage 48 helps draw the liquid polymer through the passage 38, with the water and the liquid polymer then flowing into the mixing chamber 36 where the water and the liquid polymer are then mixed together to form the polymer solution 21. Thereafter, the resulting polymer solution 21 is then passively ejected through the outlets 24 into the boundary layer 22 resulting in a reduction in the drag on the exterior surface of the hull 12.

With reference now to FIGS. 6-10, an embodiment of drag reduction on a hull 90 of a vehicle 100, for example an underwater vehicle, is illustrated. In this embodiment, instead of a liquid polymer, the polymer solution is created using a water-soluble solid polymer body 102.

Figure 6:
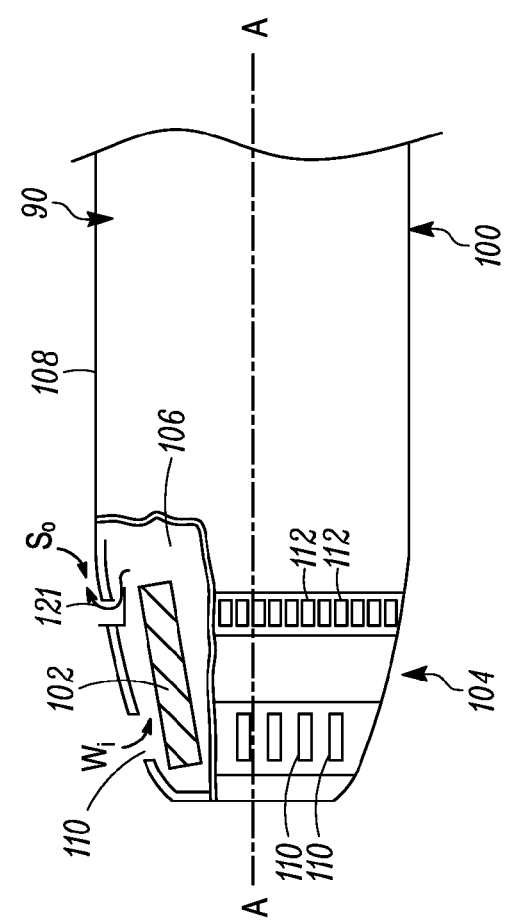
FIG. 6 illustrates a front portion of a vehicle in the form an underwater vehicle that uses a water-soluble solid polymer to create a polymer solution for drag reduction on the vehicle, with a portion of the front portion broken away to illustrate an interior space.

A front end portion 104 of the vehicle 100 is illustrated in FIG. 6. The front end portion 104 defines an interior cavity 106 between an exterior hull 108 and an interior pressure hull 109 (illustrated in FIGS. 8A and 8B). In one example, the cavity 106 can be circumferentially continuous around a central longitudinal axis A-A of the vehicle 100. The cavity 106 is located outside of the interior pressure hull 109 or boundary of the vehicle 100 so that the cavity 106 is subject to the ambient water pressure. In use, the cavity 106 forms the mixing chamber in which a polymer solution 121 is generated.

One or more water inlets 110 are formed in the exterior hull 108 through which water can flow into the cavity 106 as indicated by the arrow $W_i$ in FIG. 6. The water inlet(s) 110 is an opening or plurality of openings that can be located at the front end portion 104 or nose of the hull 90 at any location that is suitable for allowing ingress of water. In one embodiment, the water inlet(s) 110 is located at a location on the front end portion 104 where increased pressure due to stagnation of the water develops. In one embodiment, a plurality of water inlets 110 are provided (as shown in FIG. 6) that are circumferentially equally spaced from one another about the circumference of the front end 104. Each inlet 110 is individually fluidly connected to the cavity 106 so that water entering each inlet 110 flows into the cavity 106. Alternatively, each inlet 110 can communicate with an inlet water manifold (not shown) that in turn is in fluid communication with the cavity 106 to direct water from the manifold into the cavity 106.

Figure 10:
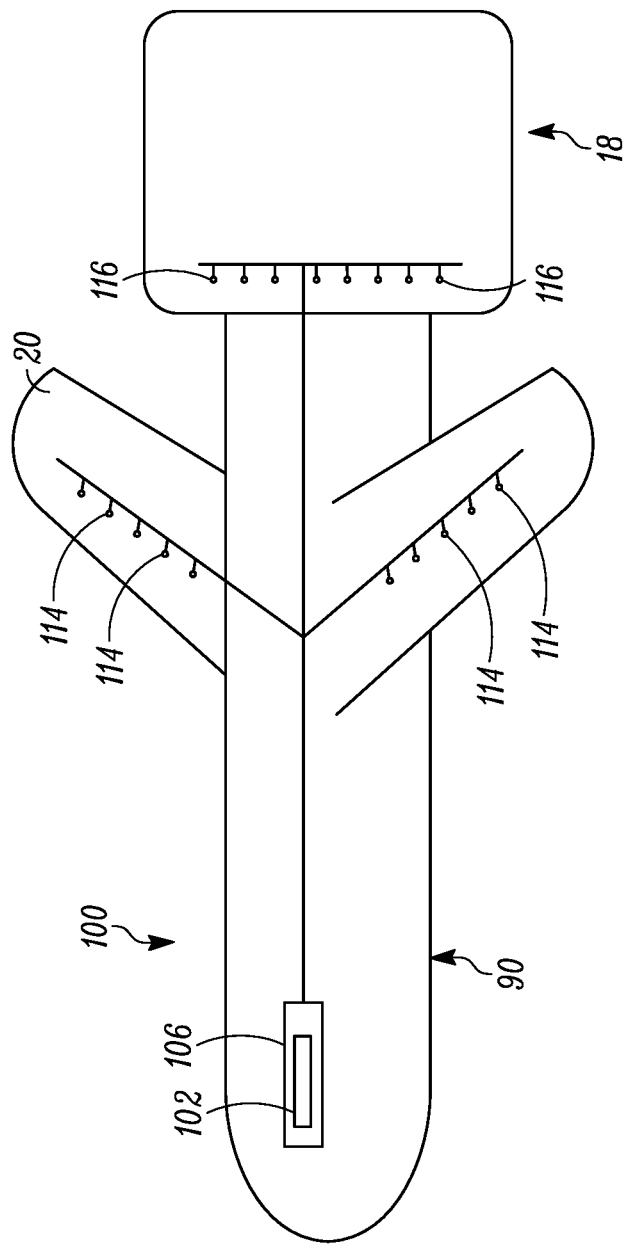
FIG. 10 is a schematic depiction of ejecting polymer solution created from the water-soluble solid polymer for drag reduction on vehicle surfaces other than or in addition to the hull.

The vehicle 100 further includes one or more polymer solution outlets 112 in a surface, such as in the hull 90, through which the polymer solution 121 is passively ejected as indicated by the arrow $S_o$. In the example illustrated in FIG. 6, a plurality of the outlets 112 are provided in the hull 90 at a location lower in pressure than the pressure at the water inlets 110 to create the pressure differential. In other embodiments, the polymer solution 121 can be ejected through one or more outlets formed in other surfaces, for example one or more outlets 114 formed in one or more of the fins 20 and/or one or more outlets 116 formed in an interior surface and/or exterior surface of the duct of the propulsion mechanism 18 as shown in FIG. 10.

Returning to FIG. 6, in the case of discharge of the polymer solution 121 around the hull 90, the water inlets 110 are positioned forwardly of the outlets 112. In addition, the outlets 112 are positioned rearwardly of the majority of the cavity 106, and are radially outward of the cavity 106 and the polymer body 102. Therefore, the flow of water through the cavity 106 and the resulting flow of the polymer solution 121 within the cavity 106 has little or no reverse or forward component back toward the front end of the vehicle 100.

The solid polymer body 102 is disposed within the cavity 106. The body 102 is positioned such that water that flows into the cavity 106 flows over and past the body 102 in contact therewith, causing a portion of the polymer in the body 102 to dissolve into the water to create the polymer solution 121. Examples of polymers that can be used are solid forms of the polymers disclosed in U.S. Pat. No. 4,186,679.

Figure 7A:
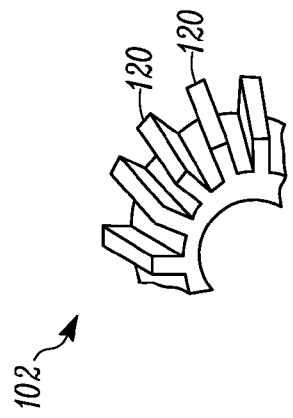
FIGS. 7A and 7B illustrate different embodiments of the water-soluble solid polymer.
Figure 7B:
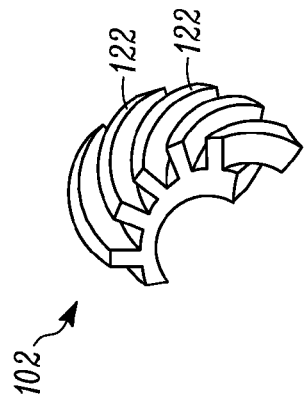

In one embodiment, the body 102 is a circumferentially continuous, ring-shaped solid body of polymer that extends circumferentially around the longitudinal axis A-A. FIGS. 7A and 7B provide perspective views of example forms of the body 102, with only portions, for example approximately one quarter, of the body 102 shown. However, the body 102 need not be circumferentially continuous, but can instead be circumferentially interrupted, for example formed in quarter or near quarter sections and the sections can abut one another or be spaced apart from one another. In one embodiment, even if the body 102 is not circumferentially continuous, the body 102 nonetheless occupies a majority of the circumference to provide adequate amounts of the polymer.

The body 102 can also be provided with a geometry that increases the surface area thereof that is exposed to the water, as well as increase the length of the flow path past the body 102 and help to mix the water and the dissolved polymer into the water. For example, FIG. 7A illustrates the body 102 as being formed with integral fins or ribs 120 that can be generally straight and parallel to the longitudinal axis A-A or straight and disposed at an angle to the axis A-A. FIG. 7B illustrates the body 102 as being formed with integral fins or ribs 122 that are curved or generally helical to introduce a swirl into the flow of water past the body 102. Many other examples of body 102 shapes and features are possible.

Figure 8B:
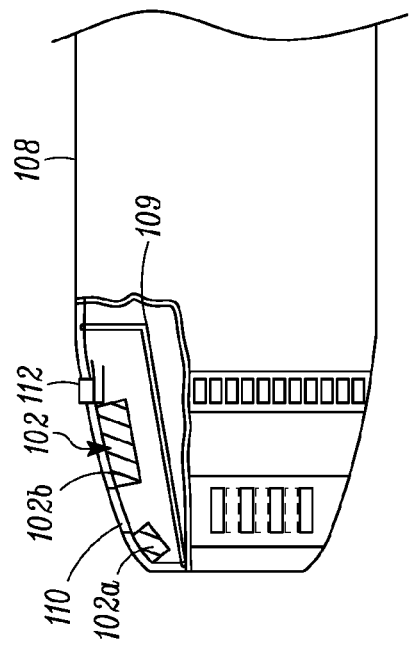
FIGS. 8A and 8B illustrate different mounting locations for the water-soluble solid polymer within the vehicle.
Figure 8A:
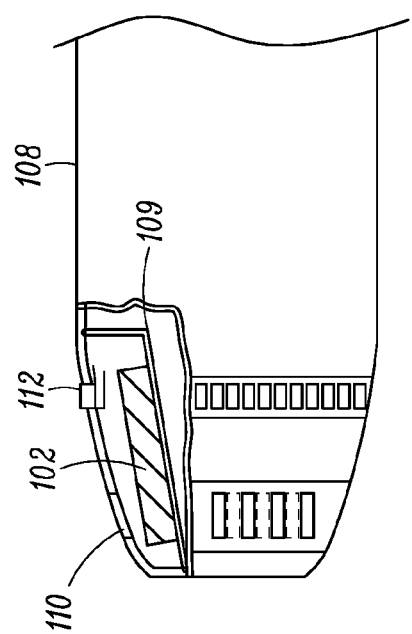

The polymer body 102 can also be fixed within the cavity 106 in any suitable manner. For example, the body 102 can be mounted on a mount structure (not shown) disposed in the cavity 106. FIG. 8A illustrates an example where the solid body 102 is mounted to an exterior surface of the interior pressure hull 109. FIG. 8B illustrates an example where the solid body 102 is mounted to an interior surface of the exterior hull 108. FIG. 8B also illustrates the body 102 as being formed in two separate pieces 102a, 102b, with the piece 102a being mounted to the interior surface of the hull 108 forwardly of the inlets 110, and the piece 102b being mounted to the interior surface of the hull 108 between the inlet 110 and the outlets 112.

Returning to FIG. 6, the water can be allowed to flow continuously into the cavity 106 through the water inlets 110 and out of the outlets 112. Alternatively, a flow control mechanism can be provided to control the flow of water through the water inlets 110 and thus through the vehicle 100. For example, with reference to FIGS. 9A and 9B, a rotatable inlet cover 130 can be rotatably disposed on hull 108 at the front end 104. The inlet cover 130 can include a plurality of openings 132 extending therethrough. The inlet cover 130 can be circumferentially rotated relative to the hull 108, manually or using a suitable mechanical drive mechanism, between a first position (shown in FIG. 9A) where the openings 132 are aligned with the water inlets 110 to permit maximum water entry into the cavity 106 and a second position (shown in FIG. 9B) where the openings 132 are not aligned with the water inlets 110 thereby preventing the inflow of water. Other types of flow control mechanisms can be used, including mechanisms that are actuated axially instead of being rotated. Further, a similar type of flow control mechanism can be utilized on the outlets 112 in order to control the flow of the polymer solution 121 through the outlets 112. In addition, a similar type of flow control mechanism can be used in the embodiments discussed above in FIGS. 1-5.

With reference to FIG. 6, an example operation of drag reduction on the hull 90 of the vehicle 100 will be described. Drag reduction on other surfaces of the vehicle 100 operates in a similar manner, for example as illustrated in FIG. 10. This example will also assume that a flow control mechanism such as the mechanism 130 described in FIGS. 9A and 9B is utilized. Assuming that the flow control mechanism is initially closed, when drag reduction is desired, the flow control mechanism is actuated to the first, open position allowing water to flow into the cavity 106 through the inlets 110. The water flows past the body 102 dissolving some of the solid polymer which mixes with the water to create the polymer solution 121 in the cavity 106. Thereafter, the polymer solution 121 is then passively ejected through the outlets 112 into the boundary layer resulting in a reduction in the drag on the exterior surface of the hull 90. With this construction, due to the pressure differential created by the positioning of the inlets 110 and the outlets 112, the polymer solution 121 is passively ejected and is not pumped by an electrically driven pump, and the creation and discharge of the polymer solution 121 can be accomplished without the use of electrical energy.

Figure 11:
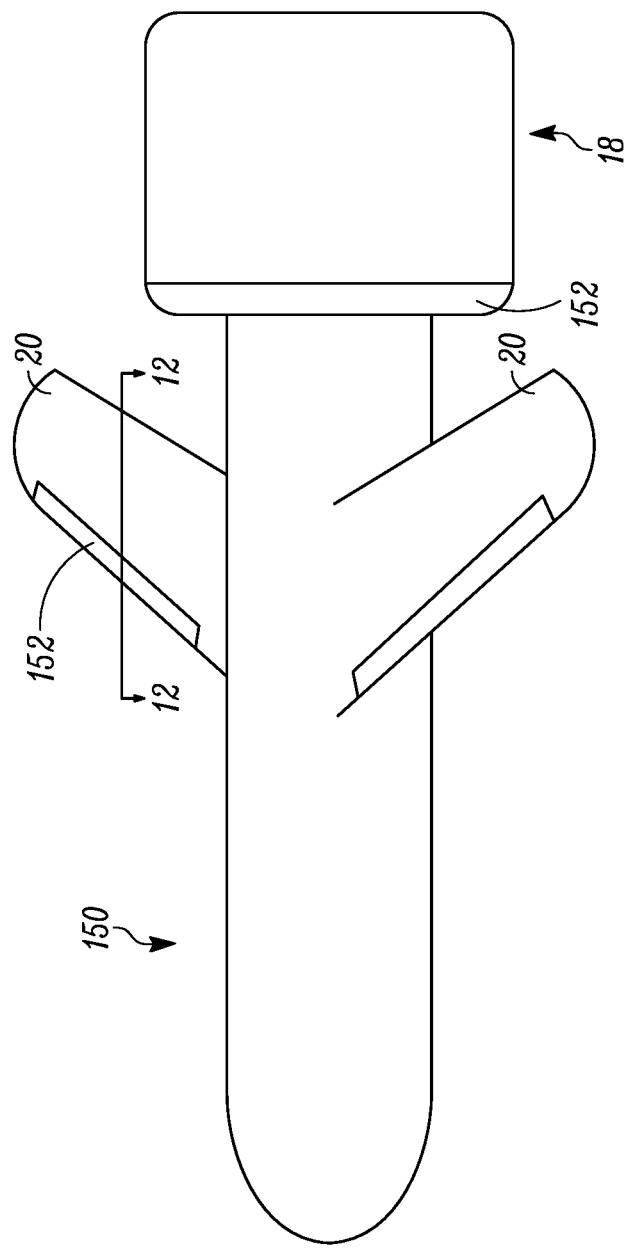
FIG. 11 depicts another embodiment where a water-soluble solid polymer is mounted directly on a surface of a vehicle so that the solid polymer is directly exposed to the water flowing past the surface.

With reference now to FIGS. 11-13, another embodiment of drag reduction on surfaces of a vehicle 150, for example an underwater vehicle, is illustrated. In this embodiment, a water-soluble solid polymer body 152 is molded into a shape that is removably affixed directly onto an exterior portion of a surface of the vehicle 150 that is directly exposed to the water. Therefore, the polymer body 152 is directly exposed to the flow of water past the surface, and the polymer of the body dissolves directly into the water. The polymer body 152 can be removably affixed to any desired surface of the vehicle 150 that is in contact with the water. In one embodiment, the polymer body 152 can be designed to attach to the surface to form at least a portion of a leading edge of the surface.

For example, with reference to FIG. 12, a cross-sectional view of one of the fins 20 of the vehicle 150 of FIG. 11 is illustrated. The polymer body 152 is mounted at a front end 154 of the fin 20 thereby forming the leading edge of the fin 20. FIG. 13 is a perspective view of a front portion of the duct of the propulsion mechanism 18 where the polymer body 152 is mounted at a front end of the duct thereby forming a leading edge of the duct. However, the polymer body 152 can be mounted to locations on the surfaces other than leading edges, as long as the polymer body 152 is in direct contact with the water to create the polymer solution, and the polymer solution ends up in the boundary layer to reduce drag.

With reference to FIG. 12, the polymer body 152 can include a support base 156 that is used to removably affix the polymer body 152 to the front end 154, and a water-soluble solid polymer 158 attached to the support base 156. The support base 156 can be a rigid structure such as a metal or plastic plate that can be removably attached to the fin 20 using removable fastening means such as mechanical fasteners like screws or bolts, or an adhesive. The water-soluble solid polymer 158 can be secured to the base 156, for example by being molded directly onto the base 156 or being adhered to the base 156. Examples of polymers that can be used are solid forms of the polymers disclosed in U.S. Pat. No. 4,186,679. Removably affixing the polymer body 152 to the fin 20 or other surface permits replacement of the polymer body 152 once the polymer 158 dissolves over time. In other embodiments, the polymer body 152 can be non-removably affixed to the fin 20 or other surface.

In embodiments where the polymer body 152 forms some or all of a surface, such as forming the leading edge as shown in FIGS. 12 and 13, the water-soluble solid polymer 158 attached to the base 156 is hydrodynamically-shaped to maintain the hydrodynamic efficiency of the surface. For example, as shown in FIG. 12, the solid polymer 158 can be bullet-shaped to match what would be the shape of the leading edge of the fin 20 if the polymer body 152 were not present.

In the embodiments described herein, the outlets 24, 112 are not limited to being rearward of the water inlets 42, 110. In some embodiments, the outlets 24, 112 could be positioned forwardly of the water inlets 42, 110, or some of the outlets 24, 112 can be positioned forwardly of the water inlets 42, 110 while some of the outlets 24, 112 are positioned rearwardly of the water inlets 42, 110. Many other configurations are possible as long as the polymer solution can be passively ejected.

The examples disclosed in this application are to be considered in all respects as illustrative and not limitative.

The scope of the invention is indicated by the appended claims rather than by the foregoing description; and all changes which come within the meaning and range of equivalency of the claims are intended to be embraced therein.

The invention claimed is:

1. A reduced drag vehicle, comprising:
a structure having a forward end, an interior, and an outer surface;
a plurality of water inlets in the forward end through which water can flow into the interior of the structure;
a mixing chamber in the interior of the structure in fluid communication with the plurality of water inlets and receiving water that flows into the structure through the plurality of water inlets;
a liquid polymer within a storage chamber disposed in the interior of the structure;
at least one fluid passage extending from the storage chamber and fluidly connecting to the mixing chamber to allow the liquid polymer from the storage chamber to mix with the water in the mixing chamber to form a polymer solution;
a metering valve in the at least one fluid passage that controls the flow of the liquid polymer from the storage chamber into the mixing chamber;
a plurality of polymer solution outlets in the outer surface in fluid communication with the mixing chamber through which the polymer solution is ejected from the structure into a boundary layer to reduce drag on the outer surface as the structure moves in a forward direction through water with the water flowing past the forward end and then over the polymer solution outlets in the outer surface;
the plurality of water inlets are positioned forwardly of the plurality of polymer solution outlets;
the plurality of polymer solution outlets are positioned rearwardly of at least a portion of the mixing chamber; and
the pressure at the water inlets is higher than the pressure at the polymer solution outlets so that the polymer solution is passively ejected from at least one of the polymer solution outlets.

2. A reduced drag vehicle, comprising:
a structure having a forward end, an interior, and an outer surface;
a plurality of water inlets in the forward end through which water can flow into the interior of the structure;
a mixing chamber in the interior of the structure in fluid communication with the plurality of water inlets and receiving water that flows into the structure through the plurality of water inlets;
a polymer within the interior of the structure in communication with the mixing chamber, the polymer mixes with the water in the mixing chamber to form a polymer solution;
a plurality of polymer solution outlets in the outer surface in fluid communication with the mixing chamber through which the polymer solution is ejected from the structure into a boundary layer to reduce drag on the outer surface as the structure moves in a forward direction through water with the water flowing past the forward end and then over the polymer solution outlets in the outer surface;
the plurality of water inlets are positioned forwardly of the plurality of polymer solution outlets;
the plurality of polymer solution outlets are positioned rearwardly of at least a portion of the mixing chamber;
the pressure at the water inlets is higher than the pressure at the polymer solution outlets so that the polymer solution is passively ejected from at least one of the polymer solution outlets;
the polymer is a liquid polymer that is contained in a storage chamber that is fluidly connected to the mixing chamber; and
wherein the storage chamber is a compressible bladder, the compressible bladder is exposed to ambient pressure of water that the reduced drag vehicle is operating in, and further comprising a force applying mechanism acting on the compressible bladder.

3. The reduced drag vehicle of claim 1, wherein the reduced drag vehicle is devoid of an electrically driven pump so that water that flows into the plurality of water inlets, the liquid polymer and the polymer solution are not distributed by a pump.

4. A reduced drag vehicle, comprising:
a structure having an interior, a forward end, and at least one outer surface that is subject to drag as a result of the structure moving in a forward direction through water with the water flowing past the forward end and then over the at least one outer surface;
a compressible bladder contained in the interior of the structure and exposed to ambient pressure, the compressible bladder containing a liquid polymer;
a mixing chamber in the interior of the structure in fluid communication with the compressible bladder to receive liquid polymer therefrom;
a metering valve that controls the flow of liquid polymer from the compressible bladder into the mixing chamber;
at least one water inlet on the structure through which water can flow into the interior of the structure, the at least one water inlet is fluidly connected to the mixing chamber;
wherein liquid polymer from the compressible bladder and water from the at least one water inlet mix in the mixing chamber to form a polymer solution;
a polymer solution discharge line fluidly connected to the mixing chamber;
at least one polymer solution outlet formed in the at least one outer surface that is subject to drag and fluidly connected to the polymer solution discharge line to discharge polymer solution from the at least one polymer solution outlet to reduce drag on the at least one outer surface; and
the pressure at the at least one water inlet is higher than the pressure at the at least one polymer solution outlet so that the polymer solution is passively ejected from the at least one polymer solution outlet without use of an electrically driven pump.

5. The reduced drag vehicle of claim 4, wherein the structure is a hull, and the at least one outer surface is a surface of the hull.

6. The reduced drag vehicle of claim 4, wherein the structure is a fixed or actuatable fin, and the at least one outer surface is an outer surface of the fin.

7. The reduced drag vehicle of claim 4, wherein the structure is a duct of a propulsion mechanism, and the at least one outer surface is an outer surface of the duct.

8. The reduced drag vehicle of claim 4, further comprising a force applying mechanism acting on the compressible bladder.

9. A reduced drag vehicle, comprising:
a structure having an interior, a forward end, and at least one outer surface that is subject to drag as a result of the structure moving through water with the water flowing past the forward end and then over the at least one outer surface;

at least one water inlet on the structure through which water can flow into the interior of the structure;

a mixing chamber in the interior of the structure and fluidly connected to the at least one water inlet and receiving water that flows into the structure through the at least one water inlet;

a water-soluble solid polymer disposed in the mixing chamber, wherein water entering the mixing chamber dissolves at least a portion of the water-soluble solid polymer to form a polymer solution in the mixing chamber;

at least one polymer solution outlet formed in the at least one outer surface that is subject to drag and fluidly connected to the mixing chamber to discharge polymer solution from the at least one polymer solution outlet to reduce drag on the at least one outer surface;

the at least one water inlet is positioned forwardly of the at least one polymer solution outlet; and the at least one polymer solution outlet is positioned radially outward of the water-soluble solid polymer and the mixing chamber.

10. The reduced drag vehicle of claim 9, wherein the structure is a hull, and the at least one outer surface is a surface of the hull.

11. The reduced drag vehicle of claim 9, wherein the structure is a fixed or actuatable fin, and the at least one outer surface is an outer surface of the fin.

12. A reduced drag vehicle, comprising:

a structure having an interior, a forward end, and at least one outer surface that is subject to drag as a result of the structure moving through water with the water flowing past the forward end and then over the at least one outer surface;

at least one water inlet on the structure through which water can flow into the interior of the structure;

a mixing chamber in the interior of the structure and fluidly connected to the at least one water inlet and receiving water that flows into the structure through the at least one water inlet;

a water-soluble solid polymer disposed in the mixing chamber, wherein water entering the mixing chamber dissolves at least a portion of the water-soluble solid polymer to form a polymer solution in the mixing chamber;

at least one polymer solution outlet formed in the at least one outer surface that is subject to drag and fluidly connected to the mixing chamber to discharge polymer solution from the at least one polymer solution outlet to reduce drag on the at least one outer surface;

the at least one water inlet is positioned forwardly of the at least one polymer solution outlet;

the at least one polymer solution outlet is positioned radially outward of the water-soluble solid polymer and the mixing chamber; and wherein the structure is a duct of a propulsion mechanism, and the at least one outer surface is an outer surface of the duct.

13. A method of reducing drag on an outer surface of a vehicle that travels through water, where the outer surface is in direct contact with the water creating drag on the outer surface as the vehicle travels through the water in a forward direction, the method comprising:

removably affixing an assembly that includes a water-soluble solid polymer to a portion of the outer surface with the water-soluble solid polymer directly exposed to the water so that as the vehicle travels in the forward direction through the water, the water-soluble solid polymer dissolves creating a polymer solution that flows over the outer surface to reduce drag on the outer surface, wherein the solid polymer includes an outer surface that forms a continuation of the outer surface of the vehicle.

14. The method of claim 13, further comprising removing the assembly from the outer surface, and removably affixing a replacement assembly that includes a water-soluble solid polymer to the portion of the outer surface.

15. The method of claim 13, wherein the outer surface of the vehicle comprises a surface of a hull of the vehicle, a surface on a fixed or actuatable fin connected to the vehicle, a surface on a duct connected to the vehicle, a surface on a nose cone or tail cone of the vehicle, or a surface of a propeller connected to the vehicle.

16. The method of claim 13, comprising removably affixing the assembly to a leading edge of the outer surface.

17. An assembly configured to be removably affixed to an outer surface of a vehicle that travels through water, where the outer surface is in direct contact with the water creating drag on the outer surface as the vehicle travels through the water in a forward direction, the assembly comprising:

a base for removably affixing the assembly to the outer surface; and a water-soluble solid polymer attached to the base, wherein the water-soluble solid polymer is hydrodynamically-shaped with an outer surface that is configured to form a continuation of the outer surface of the vehicle when the assembly is fixed to the outer surface of the vehicle.

18. The reduced drag vehicle of claim 9, further comprising a flow control mechanism associated with the at least one polymer solution outlet that is configured to control the flow of the polymer solution through the at least one polymer solution outlet and/or a flow control mechanism associated with the at least one water inlet that is configured to control the flow of the water through the at least one water inlet.

* * * * *